United States Patent
Chen et al.

(10) Patent No.: US 6,261,278 B1
(45) Date of Patent: *Jul. 17, 2001

(54) FILM WITH IMPROVED SELF-ADHESIVE PROPERTIES

(75) Inventors: Franklin M. C. Chen; Yung Hsiang Huang, both of Appleton; Thomas H. Roessler, Menasha, all of WI (US)

(73) Assignee: Kimberly-Clark Worldwide, Inc., Neenah, WI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,300

(22) Filed: Oct. 30, 1998

Related U.S. Application Data

(60) Provisional application No. 60/070,109, filed on Dec. 31, 1997.

(51) Int. Cl.[7] ............................. A61F 13/15; B32B 15/04
(52) U.S. Cl. ..................... 604/389; 428/343; 428/355 R
(58) Field of Search ......................... 602/52, 6; 604/389, 604/390; 428/343, 355 R

(56) References Cited

U.S. PATENT DOCUMENTS

| | | | |
|---|---|---|---|
| H1622 | 12/1996 | Himes | 525/89 |
| 4,657,802 | 4/1987 | Morman | 428/152 |
| 4,791,024 | 12/1988 | Clerici et al. | 428/343 |
| 5,085,655 | 2/1992 | Mann et al. | 604/389 |
| 5,286,781 | 2/1994 | Gotoh et al. | 524/505 |
| 5,412,035 | * 5/1995 | Schmitt et al. | 525/93 |

FOREIGN PATENT DOCUMENTS

| | | | |
|---|---|---|---|
| 0 249 073 B1 | 12/1987 | (EP) | C09J/7/02 |
| WO 95/30721 A1 | 11/1995 | (WO) | C09J/153/02 |
| WO 98/00471 A1 | 1/1998 | (WO) | C09J/153/02 |

OTHER PUBLICATIONS

Derwent World Patent Database abstract of JP 62–296,409: Description of Matsushita Elec Ind. Co. Ltd. (Matu), "Variable Capacitor With Stator And Rotor."

American Society for Testing Materials (ASTM) Designation: D 1238–E, "Standard Test Method for Flow Rates of Thermoplastics by Extrusion Plastometer," pp. 273–281, published Jan. 1996.

American Society for Testing Materials (ASTM) Designation: D 1505–96, "Standard Test Method for Density of Plastics by the Density–Gradient Technique1," pp. 299–304, published Sep. 1996.

American Society for Testing Materials (ASTM) Designation: D 3236–88, 'Standard Test Method for Apparent Viscosity of Hot Melt Adhesives and Coating Materials, pp. 326–331, published Dec. 1988.

American Society for Testing Materials (ASTM) Designation: D 412–98a, "Standard Test Methods for Vulcanized Rubber and Thermoplastic Elastomers—Tension1," pp. 41–53, published Apr. 1998.

American Society for Testing Materials (ASTM) Designation: D 638–95, "Standard Test Method for Tensile Properties of Plastics," pp. 45–56, published Dec. 1995.

American Society for Testing Materials (ASTM) Designation: E28–97, "Standard Test Methods for Softening Point of Resins by Ring–and–Ball Apparatus[1]," pp. 678–684, published Sep. 1997.

Sperling, L.H., *Introduction to Physical Polymer Science*, Second Edition, John Wiley & Sons, Inc., 1992, pp. 320–323.

* cited by examiner

Primary Examiner—Dennis Ruhl
(74) Attorney, Agent, or Firm—Sebastian C. Pugliese III

(57) ABSTRACT

A film that comprises a mixture of a block copolymer and a polyethylene polymer. One embodiment of such a film is a film comprising a block copolymer selected from the group consisting of poly(styrene)-co-poly(ethylene-butylene)-co-poly(styrene) copolymer and poly(styrene)-co-poly(ethylene-butylene) copolymer, and a polyethylene polymer. The film exhibits improved self-adhesive properties and is suitable for use in a disposable absorbent product intended for the absorption of fluids such as body fluids.

18 Claims, No Drawings

FILM WITH IMPROVED SELF-ADHESIVE PROPERTIES

This application claims priority from U.S. provisional application Ser. No. 60/070,109 filed on Dec. 31, 1997.

BACKGROUND OF THE INVENTION

1. Field of the Invention

The present invention relates to a film that comprises a mixture of a polyethylene polymer and a block copolymer. The film exhibits improved self-adhesive properties and is suitable for use in a disposable absorbent product intended for the absorption of fluids such as body fluids.

2. Description of the Related Art

Disposable absorbent products currently find widespread use in many applications. For example, in the infant and child care areas, diapers and training pants have generally replaced reusable cloth absorbent articles. Other typical disposable absorbent products include feminine care products such as sanitary napkins or tampons, adult incontinence products, and health care products such as surgical drapes or wound dressings. A typical disposable absorbent product generally comprises a composite structure including a topsheet, a backsheet, and an absorbent structure between the topsheet and backsheet. These products usually include some type of fastening system, such as adhesive fastening tapes, for fitting the product onto a wearer.

Although current disposable baby diapers and other disposable absorbent products have been generally accepted by the public, these products still have need of improvement in specific areas. For example, the fastening system used on many disposable absorbent products could use improving.

As such, there is a need for new materials that may be used in disposable absorbent products that are useful as an adhesive fastening tape.

It is therefore an object of the present invention to provide a film which exhibits improved adhesive properties.

It is also an object of the present invention to provide a composition comprising polyethylene and a block copolymer which may be easily and efficiently formed into a film which may be useful as an adhesive fastening tape.

SUMMARY OF THE INVENTION

The present invention concerns a film that exhibits desirable adhesive properties and is useful as an adhesive fastening tape in a disposable absorbent product.

One aspect of the present invention concerns a film that comprises a mixture of a first component and a second component.

One embodiment of such a film comprises a mixture of a polyethylene and a block copolymer, wherein the film exhibits desired properties.

One particular embodiment of the present invention is a film comprising a mixture of a block copolymer selected from the group consisting of poly(styrene)-co-poly(ethylene-butylene)-co-poly(styrene) copolymer, poly(styrene)-co-poly(ethylene-butylene) copolymer, and a mixture of such copolymers, wherein the block copolymer is present in the film in a weight amount that is between about 30 weight percent to about 95 weight percent, and a polyethylene polymer, wherein the polyethylene polymer is present in the thermoplastic composition in a weight amount that is between about 5 weight percent to about 70 weight percent, wherein all weight percents are based on the total weight amount of the block copolymer and the polyethylene polymer present in the film, wherein the film exhibits a Peak Load of Auto-Adhesive Strength value that is greater than about 400 grams per inch width of the film.

In another aspect, the present invention concerns a disposable absorbent product comprising a film of the present invention.

DETAILED DESCRIPTION OF THE PREFERRED EMBODIMENTS

The present invention is directed to a film which includes a first component and a second component. As used herein, the term "film" is meant to describe a substantially nonwoven, continuous sheet of material with no identifiable, individual fibers or the like. Nonwoven films are known to be able to be prepared by a variety of processes such as, for example, extrusion processes.

As used herein, the term "comprising" is intended to be synonymous with "including", "having", "containing", or "characterized by", and is intended to be inclusive or open-ended and is not intended to exclude additional, unrecited elements or method steps.

The first component in the film is a block copolymer. A number of block copolymers can be used to prepare the film of this invention. Such block copolymers generally comprise an elastomeric midblock portion and a thermoplastic endblock portion. The block copolymers used in this invention generally have a three-dimensional physical crosslinked structure below the endblock portion glass transition temperature (Tg) and are elastomeric. The block copolymers are also thermoplastic in the sense that they can be melted above the endblock glass transition temperature, formed, and resolidified several times with little or no change in physical properties (assuming a minimum of oxidative degradation).

As used herein, the term "thermoplastic" is meant to describe a material that softens when exposed to heat and which substantially returns to its original condition when cooled to room temperature.

One way of synthesizing such block copolymers is to polymerize the thermoplastic endblock portions separately from the elastomeric midblock portions. Once the midblock and endblock portions have been separately formed, they can be linked. Typically, midblock portions can be obtained by polymerizing di- and tri-unsaturated $C_4$–$C_{10}$ hydrocarbons such as, for example, dienes such as butadiene and isoprene, and trienes such as 1,3,5-heptatriene. When an endblock portion A is joined to a midblock portion B, an A-B block copolymer unit is formed, which unit can be coupled by various techniques or with various coupling agents C to provide a structure such as A-B-A, which is believed to comprise two A-B blocks joined together in a tail-to-tail A-B-C-B-A arrangement. By a similar technique, a radial block copolymer can be formed having the formula (A-B)$_n$C, wherein C is the hub or central, polyfunctional coupling agent and n is a number greater than 2. Using the coupling agent technique, the functionality of C determines the number of A-B branches.

Endblock portion A generally comprises a poly(vinylarene), such as polystyrene, having a weight average molecular weight between about 1,000 and about 60,000. Midblock portion B generally comprises a substantially amorphous polyolefin such as polyisoprene, ethylene/propylene copolymers, ethylene/butylene copolymers, polybutadiene, or mixtures thereof, having a weight average molecular weight between about 5,000 and about 450,000. The total weight average molecular weight of the block copolymer is suitably between about 10,000 to about 500,000 and more suitably between about 200,000 to about 300,000. Any residual unsaturation in the midblock portion of the block copolymer can be hydrogenated selectively so that the content of olefinic double bonds in the block copolymers can be reduced to a residual proportion of beneficially less than about 5 percent and suitably less than about 2 percent. Such hydrogenation tends to reduce sensitivity to oxidative degradation and may have beneficial effects upon elastomeric properties.

Suitable block copolymers used in this invention comprise at least two substantially polystyrene endblock portions and at least one substantially ethylene/butylene midblock portion. Suitably, the block copolymer useful in the present invention is selected from the group consisting of poly(styrene)-co-poly (ethylene-butylene)-co-poly(styrene) copolymer, poly(styrene)-co-poly(ethylene- butylene) copolymer, and a mixture of such copolymers. Ethylene/butylene typically comprises the major amount of the repeating units in such block copolymers and can constitute, for example, 70 percent by weight or more of the block copolymer. The block copolymer, if radial, can have three or more arms, and good results can be obtained with, for example, four, five, or six arms. The midblock portion can be hydrogenated, if desired.

In one embodiment of the present invention, in addition to using a block copolymer selected from the group consisting of poly(styrene)-co-poly(ethylene-butylene)-co-poly (styrene) copolymer, poly(styrene)-co-poly(ethylene-butylene) copolymer, and a mixture of such copolymers, it is desired that a poly(styrene)-co-poly(ethylene-propylene)-co-poly(styrene) copolymer be used as an additional component in the film.

Linear block copolymers, such as A-B-A or A-B-A-B-A, are suitably selected on the basis of endblock content, large endblocks being preferred. For polystyrene-ethylene/butylene-polystyrene block copolymers, a styrene content in excess of about 10 weight percent is suitable, such as between about 12 to about 30 weight percent. With higher styrene content, the polystyrene endblock portions generally have a relatively high molecular weight. A commercially available example of a linear block copolymer is a styrene-ethylene/butylene-styrene block copolymer, commercially available from the Shell Chemical Company, of Houston, Tex., under the trade designation KRATON™ G1659 elastomeric resin. KRATON G1659 elastomeric resin is reported to be a blend of about 70 weight percent of poly(styrene)-co-poly(ethylene-butylene)-co-poly(styrene) copolymer and about 30 weight percent of poly(styrene)-co-poly(ethylene-butylene) copolymer. Typical properties of KRATON G1659 elastomeric resin are reported to include a weight percent of polystyrene block of between about 13 weight percent to about 18 weight percent, with the remainder being the poly(ethylene-butylene) midblock portion, a weight average molecular weight of the poly(ethylene-butylene) midblock portion that is in the range of about 100,000 to about 130,000, a tensile strength of about 3400 pounds per square inch, a 300 percent modulus of about 354 pounds per square inch, a percent of elongation of about 750, according to ASTM D-412.

It is generally desired that the block copolymer be present in the film in an amount effective to result in the film exhibiting desired adhesive properties. If the block copolymer is present in the film in too small of an amount, the film will generally exhibit poor self-adhesive properties, thereby limiting the use of the film, in applications such as an adhesive fastening tape in a disposable absorbent product. Furthermore, if the block copolymer is present in the film in too large of an amount, the film will also generally exhibit poor self-adhesive properties, thereby limiting the use of the film, in applications such as an adhesive fastening tape, in a disposable absorbent product.

The block copolymer will generally be present in the film of the present invention in an amount beneficially from about 30 weight percent to about 95 weight percent, more beneficially between about 40 weight percent to about 95 weight percent, suitably between about 50 weight percent to about 95 weight percent, more suitably between about 55 weight percent to about 90 weight percent, and even more suitably between about 60 weight percent to about 85 weight percent, wherein all weight percents are based on the total weight amount of the block copolymer and the polyethylene polymer present in the film. The compositional ratio of the various components in the film is generally important to obtain the desired adhesive properties of the film.

Block copolymers are often used to prepare films because such block copolymers generally provide desired cohesive strength properties to a film because of the rubber-like properties of the block copolymers. However, as part of the research work associated with the development of the present invention, it was discovered that a film prepared consisting essentially of a thermoplastic block copolymer, such as a poly(styrene)-co-poly(ethylene-butylene)-co-poly (styrene) copolymer or a poly(styrene)-co-poly(ethylene-butylene) copolymer, generally exhibits limited self-adhesive properties, thereby preventing the use of such a film in certain adhesive applications.

It would, therefore, be desirable to improve the adhesive properties of a film comprising a block copolymer. As such, the research work associated with the development of the present invention attempted to mix the block copolymer with an additive which would result in a film that exhibited desirable adhesive properties and, particularly, improved adhesive properties as compared to a film that consisted essentially of the block copolymer. One problem with many potential additives, however, is that after processing of a mixture of the block copolymer and the additive into a film has occurred, many such additives generally associate with either the elastomeric midblock portion or the thermoplastic endblock portion of the block copolymer or, otherwise, generally negatively affect the desired adhesive properties of the prepared film.

Effective results, wherein a film exhibited desired adhesive properties, was achieved by using, as an additive to the block copolymer, a polyethylene polymer. The improvement in adhesive properties of a film comprising both the block copolymer and the polyethylene polymer was quite unexpected in that films prepared from polyethylene polymer generally exhibit no adhesive properties. Thus, as a result of the research work associated with the development of the present invention, it was discovered that a film prepared comprising a thermoplastic block copolymer, such as a poly(styrene)-co-poly(ethylene-butylene)-co-poly(styrene) copolymer or a poly(styrene)-co-poly(ethylene-butylene) copolymer, and a polyethylene polymer generally exhibits desirable self-adhesive properties although films prepared consisting essentially of the individual components generally exhibit undesirable self-adhesive properties. While not wishing to be bound hereby, it is believed that the polyethylene polymer generally provides two different functions. First, the polyethylene polymer is believed to plasticize the block copolymer during thermal processing of a mixture of the two components so as to provide more free volume for block copolymer chain diffusion across the interface of a film being prepared from the mixture. Second, the polyethylene polymer adds an additional diffusion species in the mixture of the two components so that there will be additional species of molecules diffused across the interface of a prepared film which generally improves the self adhesion properties of such a film.

Therefore, the second component in the film of the present invention is a polyethylene polymer. The polyethylene polymer may be a high or low density polymer and may generally be a linear or a branched chain polymer. Methods of forming polyethylene polymer are known to those skilled in the art. Suitable polyethylene polymers are known and may be obtained, for example, from The Dow Chemical Company of Midland, Mich., under the designation Dow 503A polyethylene polymer, or from Quantum Chemical Company, of Cincinnati, Ohio, under the designation Quantum NA 601 polyethylene polymer.

It is generally desired that the polyethylene polymer exhibit both a weight average molecular weight a number average molecular weight that are effective for the film to exhibit desirable melt strength, film mechanical strength, fiber processing, and adhesive properties. In general, if the molecular weight of a polyethylene polymer is too high, this represents that the polymer chains may become heavily entangled which may result in a thermoplastic composition comprising that polyethylene polymer being difficult to process. Conversely, if the molecular weight of a polyethylene polymer is too low, this represents that the polymer chains are not entangled enough which may result in a thermoplastic composition comprising that polyethylene polymer exhibiting a relatively weak melt strength, making high speed processing very difficult.

In one embodiment of the present invention, polyethylene polymers suitable for use in the present invention exhibit weight average molecular weights that are beneficially between about 1,500 to about 2,000,000, more beneficially between about 2,000 to about 1,000,000, and suitably between about 5,000 to about 100,000. The weight average molecular weight for polymers or polymer blends can be determined using methods well known to those skilled in the art.

In another embodiment of the present invention, polyethylene polymers suitable for use in the present invention exhibit number average molecular weights that are beneficially between about 2,000 to about 30,000, more beneficially between about 3,000 to about 20,000, and suitably between about 5,000 to about 16,000. The number average molecular weight for polymers or polymer blends can be determined using methods well known to those skilled in the art.

It is generally desired that the polyethylene polymer suitable for use in the present invention exhibit a melting temperature that is beneficially between about 100° C. to about 210° C., more beneficially between about 110° C. to about 190° C., and suitably between about 120° C. to about 180° C.

It is generally desired that the polyethylene polymer suitable for use in the present invention exhibit a degree of chain branching wherein the number of branching in the polyethylene polymer is beneficially between about 3 branches per 1000 carbon atoms to about 50 branches per 1000 carbon atoms. The number of carbon atoms in each branch is beneficially between 1 to about 10. The chain branching frequency and length of a polyethylene polymer can generally be determined by nuclear magnetic resonance spectroscopy.

It is generally desired that the polyethylene polymer be present in the film in an amount effective to result in the film exhibiting desired adhesive properties. If the polyethylene polymer is present in the film in too small of an amount, the film will generally exhibit poor self-adhesive properties, thereby limiting the use of the film, in applications such as an adhesive fastening tape, in a disposable absorbent product. Furthermore, if the polyethylene polymer is present in the film in too large of an amount, the film will also generally exhibit poor self-adhesive properties, thereby limiting the use of the film, in applications such as an adhesive fastening tape, in a disposable absorbent product.

Therefore, the polyethylene polymer will be present in the film of the present invention in a weight amount that is beneficially between about 5 weight percent to about 70 weight percent, more beneficially between about 5 weight percent to about 60 weight percent, suitably between about 5 weight percent to about 50 weight percent, more suitably between about 10 weight percent to about 45 weight percent, and even more suitably between about 15 weight percent to about 40 weight percent, wherein all weight percents are based on the total weight amount of the polyethylene polymer and the block copolymer present in the film. The compositional ratio of the various components in the film is generally important to obtain the desired adhesive properties of the film.

While the principal components of the film of the present invention have been described in the foregoing, such a film is not limited thereto and can include other components not adversely effecting the desired properties of the film. Exemplary materials which could be used as additional components would include, without limitation, amorphous poly (alpha olefins), pigments, antioxidants, stabilizers, surfactants, waxes, flow promoters, solid solvents, plasticizers, nucleating agents, particulates, and materials added to enhance the processability of the film. If such additional components are included in a film, it is generally desired that such additional components be used in an amount that is beneficially less than about 5 weight percent, more beneficially less than about 3 weight percent, and suitably less than about 1 weight percent, wherein all weight percents are based on the total weight amount of the polyethylene polymer and the block copolymer present in the film.

The film of the present invention is generally simply a processed mixture of the block copolymer and the polyethylene polymer and, if used, any additional components. In order to achieve the desired properties for the film of the present invention, it has been discovered that it is desirable that the block copolymer and the polyethylene polymer remain substantially unreacted with each other such that a copolymer comprising any of these components is not formed. As such, each of the block copolymer and the polyethylene polymer remain distinct components of the film. In order to determine if the various components remain essentially unreacted, it is possible to use techniques, such as nuclear magnetic resonance and infrared analysis, to evaluate the chemical characteristics of the final, prepared film.

Each of the block copolymer and the polyethylene polymer will generally form separate regions or domains within a film prepared from such components. However, depending on the relative amounts that are used of each of the various components, an essentially continuous phase may be formed from the component that is present in the thermoplastic composition in a relatively greater amount. In contrast, the components that are present in the film in a relatively lesser amount may form essentially discontinuous phases, forming separate regions or domains within the continuous phase of the more prevalent component wherein the more prevalent component continuous phase substantially encases the less prevalent components within its structure. As used herein, the term "encase", and related terms, are intended to mean that the more prevalent component continuous phase substantially encloses or surrounds the less prevalent components' separate regions or domains.

In one embodiment of the present invention, after dry mixing together the block copolymer and the polyethylene polymer to form a dry mixture, such dry mixture is beneficially agitated, stirred, or otherwise blended to effectively uniformly mix the components such that an essentially homogeneous dry mixture is formed. The dry mixture may then be melt blended in, for example, an extruder to effectively uniformly mix the components such that an essentially homogeneous melted mixture is formed. The essentially homogeneous melted mixture may then be cooled and pelletized. Alternatively, the essentially homogeneous melted mixture may be formed into a film or sent directly to other equipment for forming films. Other methods of mixing together the components of the present invention are also possible and will be easily recognized by one skilled in the art.

Alternative methods of mixing together the components of the present invention include first adding the block copolymer to an extruder and then adding the polyethylene polymer to such an extruder, wherein the two components being used are effectively mixed together within the extruder. In addition, it is also possible to initially melt mix both of the components together at the same time. Other methods of mixing together the components of the present invention are also possible and will be easily recognized by one skilled in the art.

The process of cooling the extruded thermoplastic composition, in the form of a film, to ambient temperature is usually achieved by simply letting the extruded film cool as is or by blowing ambient or sub-ambient temperature air over the extruded film.

It is generally desired that the melting or softening temperature of a thermoplastic composition comprising the block copolymer and the polyethylene polymer be within a range that is typically encountered in most process applications. As such, it is generally desired that the melting or softening temperature of the thermoplastic composition beneficially be between about 25° C. to about 350° C., more beneficially be between about 50° C. to about 300° C., and suitably be between about 60° C. to about 200° C.

It is generally desired that each of the block copolymer and the polyethylene polymer be melt processable. It is therefore desired that the block copolymer and the polyethylene polymer used in the present invention each exhibit a melt flow rate that is beneficially between about 1 gram per 10 minutes to about 600 grams per 10 minutes, suitably between about 5 grams per 10 minutes to about 200 grams per 10 minutes, and more suitably between about 10 grams per 10 minutes to about 150 grams per 10 minutes. The melt flow rate of a material may be determined according to a test procedure such as ASTM Test Method D1238-E.

Typical conditions for thermally processing a thermoplastic composition include using a shear rate that is beneficially between about 100 seconds$^{-1}$ to about 50000 seconds$^{-1}$, more beneficially between about 500 seconds$^{-1}$ to about 5000 seconds$^{-1}$, suitably between about 1000 seconds$^{-1}$ to about 3000 seconds$^{-1}$, and most suitably at about 1000 seconds$^{-1}$. Typical conditions for thermally processing the components also include using a temperature that is beneficially between about 100° C. to about 500° C., more beneficially between about 150° C. to about 300° C., suitably between about 175° C. to about 250° C., and suitably about 200° C.

The film of the present invention may generally be of any size or dimension as long as the film exhibits the desired adhesive properties as described herein.

The film of the present invention has been found to generally exhibit improved adhesive properties as compared to, in particular, a film comprising only the block copolymer or a film comprising only the polyethylene polymer. In particular, a film of the present invention has been found to exhibit an increase in the peak load of auto-adhesive strength. If the film exhibits a peak load of auto-adhesive strength that is too low, the film will generally not be suitable for certain desired adhesive applications, such as an adhesive fastening tape in a disposable absorbent product.

As used herein, the peak load of auto-adhesive strength is meant to represent the force required to separate a film from itself. If the film is used as an adhesive material, the peak load of auto-adhesive strength needs to meet the adhesive strength requirement for the particular application. For example, if the film is used as an adhesive fastening system in a disposable absorbent product, the peak load of auto-adhesive strength needs to be high enough to prevent the opening, sometimes referred to as pop-open, of the fastener during use.

Therefore, it is generally desired that the film exhibits a Peak Load of Auto-Adhesive Strength value that is beneficially greater than about 400 grams per inch width of the film (about 157 grams per centimeter width of the film), more beneficially greater than about 450 grams per inch width of the film (about 177 grams per centimeter width of the film), suitably greater than about 500 grams per inch width of the film (about 197 grams per centimeter width of the film), more suitably greater than about 550 grams per inch width of the film (about 217 grams per centimeter width of the film), and up to about 2000 grams per inch width of the film (about 787 grams per centimeter width of the film). The method by which the Peak Load of Auto-Adhesive Strength value for a film sample is determined is set forth below in connection with the examples.

In one embodiment of the present invention, it is desired that the film exhibits a Peak Load of Auto-Adhesive Strength value that is beneficially about 1.5 times, more beneficially about 1.75 times, and suitably about 2.0 times the Peak Load of Auto-Adhesive Strength value exhibited by an otherwise substantially identical film that consists essentially of the block copolymer.

As used herein, the term "otherwise substantially identical film that consists essentially of the block copolymer" and other similar terms are intended to refer to a control film that is prepared using substantially identical materials and a substantially identical process as compared to a film of the present invention, except that the control film does not comprise or is not prepared with the polyethylene polymer described herein but, instead, comprises an amount of additional block copolymer substantially identical to the amount of polyethylene polymer used in the film of the present invention. As such, the otherwise substantially identical film without any polyethylene polymer and the film of the present invention will generally have substantially identical basis weights. As a result of not comprising the polyethylene polymer, the otherwise substantially identical film generally will not exhibit the desired adhesive properties described herein as compared to a film of the present invention.

The film of the present invention has been found to generally exhibit an increased crystallinity as compared to, in particular, a film comprising only the block copolymer. If the film exhibits a crystallinity that is too high, the film has been found to generally exhibit low Peak Load of Auto-Adhesive Strength values, such that the film will generally not be suitable for certain desired adhesive applications, such as an adhesive fastening tape in a disposable absorbent product.

Therefore, it is generally desired that the film exhibits a Crystallinity Percent value that is beneficially between 0 percent to about 15 percent, more beneficially between about 1 percent to about 15 percent, suitably between about 2 percent to about 10 percent, and more suitably between about 3 percent to about 10 percent. The method by which the Crystallinity Percent value for a film sample is determined is set forth below in connection with the examples.

It is desired that the film of the present invention desirably exhibits elastic properties, such as an elastic modulus, that is effective for the film to be used in a disposable absorbent product. The elastic modulus value of a film is meant to represent the amount of force initially needed to stretch the film and, thus, generally represents the stiffness of the film. It is desired that the film not exhibit an elastic modulus that is too low such that the film has too soft of a feel to a user. Also, it is desired that the film not exhibit an elastic modulus that is too high such that the film requires too much initial force for the film to deform during use. For a film with good self-adhesion properties, it is generally desirable that the film exhibit an elastic modulus in the range of about $1 \times 10^4$ dynes per square centimeter to about $1 \times 10^7$ dynes per square centimeter.

The film of the present invention is suited for use in disposable products including disposable absorbent products such as diapers, adult incontinent products, and bed pads; in catamenial devices such as sanitary napkins, and tampons; and other absorbent products such as wipes, bibs, wound dressings, and surgical capes or drapes. Accordingly, in another aspect, the present invention relates to a disposable absorbent product comprising the film of the present invention, prepared from the block copolymer and the polyethylene polymer. When used in a disposable absorbent product, it is generally desired that a film exhibit desired adhesive properties, as described herein.

In one embodiment of the present invention, the block copolymer and the polyethylene polymer are formed into a multicomponent film. For purposes of illustration only, the present invention will generally be described in terms of a multicomponent film comprising only two components. However, it should be understood that the scope of the present invention is meant to include films with two or more components. In one embodiment, the film of the present invention may be used to form an adhesive fastening tape.

The film of the present invention may also be used or combined with other materials, such as other films or nonwoven elastomeric structures, with the film of the present invention being used as a separate layer or as an individual zone or area within a larger, composite structure. The film of the present invention may be combined with other materials by methods well known to those skilled in the art, such as by using adhesives, or simply by layering the different materials together and holding together the composite materials with, for example, stitching or by application of heat and pressure. The film of the present invention can also be used as a coated or co-extruded component of a composite film for applications in disposable absorbent products.

In one embodiment of the present invention, a disposable absorbent product is provided, which disposable absorbent product comprises a liquid-permeable topsheet, a backsheet attached to the liquid-permeable topsheet, and an absorbent structure positioned between the liquid-permeable topsheet and the backsheet, wherein the film of the present invention is attached to the backsheet for use as an adhesive fastening tape for securing the disposable absorbent product around or onto a wearer.

Disposable absorbent products according to all aspects of the present invention are generally subjected, during use, to multiple insults of a body liquid. Accordingly, the disposable absorbent products are desirably capable of absorbing multiple insults of body liquids in quantities to which the disposable absorbent products will be exposed during use. The insults are generally separated from one another by a period of time.

Test Methods

Peak Load of Auto-Adhesive Strength

A film sample is prepared having a length of about 6.0 inches (about 15.2 centimeters), a width of about one inch (about 2.5 centimeters), and a thickness of about 10 mils (about 250 micrometers). The film sample is folded in half, onto and aligned with itself, so as to create a two layer film composite having a length of about 3.0 inches (about 7.6 centimeters), a width of about one inch (about 2.5 centimeters), and a thickness of about 20 mils (about 500 micrometers).

At a distance of about 0.125 inch (about 0.32 centimeter) from the folded end of the film composite, a line B is drawn on the top of the film. At a distance of about 1.0 inch (about 2.5 centimeters) away from line B but towards the unfolded end C of the film composite, a line A is drawn such that line A is about 1.875 inches (about 4.8 centimeters) from the edge of the unfolded end C. A scissors is used to cut the film composite along line B, producing a two layer film composite having a length of about 2.875 inches (about 7.3 centimeters), a width of about one inch (about 2.5 centimeters), and a thickness of about 20 mils (about 500 micrometers).

A mechanically operated 4.5 pound (about 2.0 kilogram) roller is rolled over the film composite sample once in each longitudinal direction along the length of the film composite sample. The two film layers at unfolded end C of the film composite are separated by hand until the separation of the two layers reaches line A, thereby leaving the film layers still in contact with each other between line A and line B, a length of about 1.0 inch (about 2.5 centimeters).

A commercial tensile tester, available from MTS System Corporation, of Eden Prairie, Minn., under the designation SINTECH™ Model M 4011 tensile tester, was used to evaluate the film composite for adhesive properties. The upper and lower clamps of the tensile tester were set about 2 inches (about 5.1 centimeters) apart. One of the separated layers of the film composite is clamped in the upper clamp of the tensile tester and the other separated layer of the film composite is clamped in the lower camp of the tensile tester. A standard T-peel test was then conducted on the film composite, wherein the tensile tester was operated at a separation speed of the clamps of about 12 inches (about 30.5 centimeters) per minute. The peak load of force, in grams of force per unit width of the film sample, exhibited by the film sample during the evaluation was recorded. The peak load of force exhibited by the film sample during the evaluation is reported herein as the Peak Load of Auto-Adhesive Strength value, in grams of force per unit width of the film sample, of the film sample.

Crystallinity Percent

The crystallinity percent present in a film sample was determined by using a differential scanning calorimeter, available from TA Instruments Inc., of New Castle, Del., under the designation Thermal Analyst Model 2100 differential scanning calorimeter, which was outfitted with a liquid nitrogen cooling accessory and used in combination with Thermal Analyst 2200 analysis software (version 8.10) program. The principles of using a differential scanning calorimeter are well known to those skilled in the art and a suitable description may be found, for example, in the "Introduction to Physical Polymer Science", by L. H. Sperling, John Wiley & Sons, Inc., 1992, pages 320–323.

The differential scanning calorimetry curve for film samples were recorded in a nitrogen atmosphere and in the temperature range of about −120° C. to about 150° C. The film samples evaluated had a thickness of about 10 mils (about 250 micrometers), a length of about 0.25 inch (about 0.63 centimeter), and a width of about 0.125 inch (about 0.31 centimeter). It is preferred to not handle the film samples directly, but rather to use tweezers and other tools, so as not to introduce anything that would produce erroneous results. The film samples were placed into an aluminum pan and weighed to an accuracy of 0.01 mg on an analytical balance. If needed, a lid was crimped over the film sample onto the pan. The differential scanning calorimeter was calibrated using an indium metal standard and a baseline correction performed, as described in the manual for the differential scanning calorimeter. A film sample was placed into the test chamber of the differential scanning calorimeter for testing and an empty pan is used as a reference. All testing was run with a 55 cubic centimeter/minute nitrogen (industrial grade) purge on the test chamber.

First, the film sample was placed in the differential scanning calorimeter and cooled to, and allowed to equilibrate at, a temperature of about −120° C. The film sample was then heated to about 150° C. at a heating rate of about 20° C. per minute. The film sample was then maintained at about 150° C. for about one minute. The film sample was then cooled to about −120° C. at a cooling rate of about 20° C. per minute. The film sample was then maintained at about −120° C. for about one minute. The film sample was then heated to about 150° C. at a heating rate of about 10° C. per minute, during which the differential scanning calorimetry thermogram curve was recorded using a computer and a computer printer.

The endothermic heat of melting ($\Delta H_m$), in joules per gram of the film sample, of the film sample was determined at a temperature of about 110° C. The endothermic heat of melting of a film sample was determined by integrating the area of the endotherm peak. The values are determined by converting the area of the endotherm into joules per gram by use of computer software. The Crystallinity Percent of a film sample is calculated by dividing the endothermic heat of melting value of the film sample at about 110° C. by 293 joules per gram, which is taken to be the endothermic heat of melting value at about 110° C. of a film sample consisting essentially of polyethylene polymer and having 100 percent crystallinity. For each film sample, two differential scanning calorimetry evaluations were conducted and the two Crystallinity Percent values obtained averaged, with the average Crystallinity Percent value being reported herein in the examples.

EXAMPLE

Example 1

A styrene-ethylene/butylene-styrene block copolymer was obtained from the Shell Chemical Company, of Houston, Tex., under the trade designation KRATON G1659 elastomeric resin. KRATON G1659 elastomeric resin is reported to be a blend of about 70 weight percent of poly(styrene)-co-poly(ethylene-butylene)-co-poly(styrene) copolymer and about 30 weight percent of poly(styrene)-co-poly(ethylene-butylene) copolymer. Typical properties of KRATON G1659 elastomeric resin are reported to include a weight percent of polystyrene block of between about 13 weight percent to about 18 weight percent, with the remainder being the poly(ethylene-butylene) midblock portion, and a weight average molecular weight of the poly(ethylene-butylene) midblock portion that is in the range of about 100,000 to about 130,000, a tensile strength of about 3400 pounds per square inch, a 300 percent modulus of about 354 pounds per square inch, a percent of elongation of about 750, according to ASTM D-412.

A polyethylene polymer was obtained from Quantum Chemical Company, of Cincinnati, Ohio, under the designation Quantum NA 601 polyethylene polymer, reported to have a number average molecular weight of about 7,100 and a weight average molecular weight of about 26,700, a Brookfield viscosity of about 8,500 centipoise at 150° C. (as determined according to ASTM D 3236), a Brookfield viscosity of about 3300 centipoise at 190° C. (as determined according to ASTM D 3236), a density of about 0.903 gram per cubic centimeter (as determined according to ASTM D 1505), an equivalent melt index of about 2000 grams per 10 minutes (as determined according to ASTM D 1238), a ring and ball softening point of about 102° C. (as determined according to ASTM E 28), a tensile strength of about 850 pounds per square inch (about 597,600 kilograms per square meter) (as determined according to ASTM D 638), and an elongation value of about 90 percent (as determined according to ASTM D 638 ).

Mixtures of varying weight percents of the block copolymer and the polyethylene polymer were prepared and were extruded into a film by using an extruder, available from Haake Company, of Paramus, N.J., under the designation Haake TW-100 twin screw extruder. An extruded film having a thickness of about 10 mils (about 250 micrometers) was prepared. Process conditions used to prepare the film samples included using temperatures along the extruder, at locations 1, 2, 3, 4 as designated by the manufacturer, set at about 170° F. (77° C.), 180° F. (82° C.), 180° F. (82° C.), and 190° F. (88° C.), respectively. Such films were evaluated for Peak Load of Auto-Adhesive Strength values and Crystallinity Percent values. The composition of the prepared film samples and the results of the evaluations are shown in Table 1.

TABLE 1

| Sample No. | Block Copolymer Weight Percent | Polyethylene Polymer Weight Percent | Peak Load of Auto-Adhesive Strength value (in grams) | Crystallinity Percent |
|---|---|---|---|---|
| *Sample 1 | 100% | 0% | 277.0 | 0 |
| Sample 2 | 90% | 10% | 405.1 | 1.81 |
| Sample 3 | 80% | 20% | 524.4 | 3.82 |
| Sample 4 | 70% | 30% | 553.7 | 7.91 |
| Sample 5 | 65% | 35% | 597.0 | — |
| Sample 6 | 60% | 40% | 617.4 | 7.93 |

*Not an example of the present invention

Example 2

A styrene-ethylene/butylene-styrene block copolymer, was obtained from the Shell Chemical Company, of Houston, Tex., under the trade designation KRATON G1659 elastomeric resin. KRATON G1659 elastomeric resin is reported to be a blend of about 70 weight percent of poly(styrene)-co-poly(ethylene-butylene)-co-poly(styrene) copolymer and about 30 weight percent of poly(styrene)co-poly(ethylene-butylene) copolymer. Typical properties of KRATON G1659 elastomeric resin are reported to include a weight percent of polystyrene block of between about 13 weight percent to about 18 weight percent, with the remainder being the poly(ethylene-butylene) midblock portion, and a weight average molecular weight of the poly(ethylene-butylene) midblock portion that is in the range of about 100,000 to about 130,000, a tensile strength of about 3400 pounds per square inch, a 300 percent modulus of about 354 pounds per square inch, a percent of elongation of about 750, according to ASTM D-412.

A polyethylene polymer was obtained from The Dow Chemical Company, of Midland, Mich., under the designation Dow 503A polyethylene polymer, reported to have a number average molecular weight of about 15,600, a weight average molecular weight of about 68,500, a Brookfield viscosity of about 8500 centipoise at about 150° C. and about 3300 centipoise at about 190° C., as measured according to ASTM 3236, a density of about 0.903 grams per cubic centimeter, as measured according to ASTM D1505, a melt flow index of about 2000 grams per 10 minutes, as measured according to ASTM D 1238, a ring-and-ball softening point at about 102° C., as measured according to ASTM E-28, a tensile strength of about 850 pounds per square inch, as measured according to ASTM D638, and a percent of elongation of about 90 percent, as measured according to ASTM D-638.

Mixtures of varying weight percents of the block copolymer and the polyethylene polymer were prepared and were extruded into a film by using an extruder, available from Haake Company, of Paramus, N.J., under the designation Haake TW-100 twin screw extruder. An extruded film having a thickness of about 10 mils (about 250 micrometers) was prepared. Process conditions used to prepare the film samples included using temperatures along the extruder, at locations 1, 2, 3, 4 as designated by the manufacturer, set at about 170° F. (77° C.), 180° F. (82° C.), 180° F. (82° C.), and 190° F. (88° C.), respectively. Such films were evaluated for Peak Load of Auto-Adhesive Strength values and Crystallinity Percent values. The composition of the prepared film samples and the results of the evaluations are shown in Table 2.

TABLE 2

| Sample No. | Block Copolymer Weight Percent | Polyethylene Polymer Weight Percent | Peak Load of Auto-Adhesive Strength value (in grams) | Crystallinity Percent |
| --- | --- | --- | --- | --- |
| *Sample 7 | 100% | 0% | 277.0 | 0 |
| Sample 8 | 90% | 10% | 474.2 | 2.82 |
| Sample 9 | 80% | 20% | 510.0 | 7.32 |
| *Sample 10 | 70% | 30% | 261.4 | 9.90 |
| *Sample 11 | 60% | 40% | 29.2 | 11.09 |

*Not an example of the present invention

Those skilled in the art will recognize that the present invention is capable of many modifications and variations without departing from the scope thereof. Accordingly, the detailed description and examples set forth above are meant to be illustrative only and are not intended to limit, in any manner, the scope of the invention as set forth in the appended claims.

What is claimed is:

1. A self-adhesive sheet comprising a mixture of:
   a. a blend of poly(styrene)-co-poly(ethylene-butylene)-co-poly(styrene) copolymer and poly(styrene)-co-poly(ethylene-butylene) copolymer, wherein the blend is present in the sheet in a weight amount that is between about 30 weight percent to about 95 weight percent; and
   b. a polyethylene polymer, wherein the polyethylene polymer is present in the sheet in a weight amount that is between about 5 weight percent to about 70 weight percent, wherein all weight percents are based on the total weight amount of the blend and the polyethylene polymer present in the sheet,
   wherein the sheet exhibits a Peak Load of Auto-Adhesive Strength value that is greater than about 400 grams per inch width of the sheet.

2. The self-adhesive sheet of claim 1 wherein the sheet exhibits a Peak Load of Auto-Adhesive Strength value that is greater than about 450 grams per inch width of the sheet.

3. The self-adhesive sheet of claim 2 wherein the sheet exhibits a Peak Load of Auto-Adhesive Strength value that is greater than about 500 grams per inch width of the sheet.

4. The self-adhesive sheet of claim 1 wherein the polyethylene polymer exhibits a weight average molecular weight that is between about 1,500 to about 2,000,000.

5. The self-adhesive sheet of claim 1 wherein the blend is present in the sheet in a weight amount that is between about 40 weight percent to about 95 weight percent and the polyethylene polymer is present in the sheet in a weight amount that is between about 5 weight percent to about 60 weight percent.

6. The self-adhesive sheet of claim 5 wherein the blend is present in the sheet in a weight amount that is between about 50 weight percent to about 95 weight percent and the polyethylene polymer is present in the sheet in a weight amount that is between about 5 weight percent to about 50 weight percent.

7. The self-adhesive sheet of claim 1 wherein the polyethylene polymer exhibits a weight average molecular weight that is between about 1,500 to about 2,000,000, the blend is present in the sheet in a weight amount that is between about 50 weight percent to about 95 weight percent and the polyethylene polymer is present in the sheet in a weight amount that is between about 5 weight percent to about 50 weight percent, and the sheet exhibits a Peak Load of Auto-Adhesive Strength value that is greater than about 400 grams per inch width of the sheet.

8. The self-adhesive sheet of claim 7 wherein the sheet exhibits a Crystallinity Percent value that is between 0 percent to about 15 percent.

9. The self-adhesive sheet of claim 1 wherein the sheet exhibits a Crystallinity Percent value that is between 0 percent to about 15 percent.

10. A disposable absorbent product comprising a liquid-permeable topsheet, a backsheet attached to the liquid-permeable topsheet, an absorbent structure positioned between the liquid-permeable topsheet and the backsheet, and a self-adhesive sheet attached to the backsheet, wherein the self-adhesive sheet comprises a mixture of:
   a. a blend of poly(styrene)-co-poly(ethylene-butylene)-co-poly(styrene) copolymer and poly(styrene)-co-poly(ethylene-butylene) copolymer, wherein the blend is present in the sheet in a weight amount that is between about 30 weight percent to about 95 weight percent; and
   b. a polyethylene polymer, wherein the polyethylene polymer is present in the sheet in a weight amount that is between about 5 weight percent to about 70 weight percent, wherein all weight percents are based on the total weight amount of the blend and the polyethylene polymer present in the sheet,
wherein the sheet exhibits a Peak Load of Auto-Adhesive Strength value that is greater than about 400 grams per inch width of the sheet.

11. The disposable absorbent product of claim 10 wherein the polyethylene polymer exhibits a weight average molecular weight that is between about 1,500 to about 2,000,000.

12. The disposable absorbent product of claim 10 wherein the self-adhesive sheet exhibits a Crystallinity Percent value that is between 0 percent to about 15 percent.

13. The disposable absorbent product of claim 10 wherein the self-adhesive sheet exhibits a Peak Load of Auto-Adhesive Strength value that is greater than about 450 grams per inch width of the sheet.

14. The disposable absorbent product of claim 13 wherein the self-adhesive sheet exhibits a Peak Load of Auto-Adhesive Strength value that is greater than about 500 grams per inch width of the sheet.

15. The disposable absorbent product of claim 10 wherein the blend is present in the self-adhesive sheet in a weight amount that is between about 40 weight percent to about 95 weight percent and the polyethylene polymer is present in the self-adhesive sheet in a weight amount that is between about 5 weight percent to about 60 weight percent.

16. The disposable absorbent product of claim 15 wherein the blend is present in the self-adhesive sheet in a weight amount that is between about 50 weight percent to about 95 weight percent and the polyethylene polymer is present in the self-adhesive sheet in a weight amount that is between about 5 weight percent to about 50 weight percent.

17. The disposable absorbent product of claim 10 wherein the polyethylene polymer exhibits a weight average molecular weight that is between about 1,500 to about 2,000,000, the blend is present in the self-adhesive sheet in a weight amount that is between about 50 weight percent to about 95 weight percent and the polyethylene polymer is present in the self-adhesive sheet in a weight amount that is between about 5 weight percent to about 50 weight percent, and the self-adhesive sheet exhibits a Peak Load of Auto-Adhesive Strength value that is greater than about 400 grams per inch width of the sheet.

18. The disposable absorbent product of claim 17 wherein the self-adhesive film exhibits a Crystallinity Percent value that is between 0 percent to about 15 percent.

* * * * *

UNITED STATES PATENT AND TRADEMARK OFFICE
CERTIFICATE OF CORRECTION

PATENT NO.    : 6,261,278 B1
DATED         : July 17, 2001
INVENTOR(S)   : Franklin M. C. Chen, Yung Hsiang Huang and Thomas H. Roessler It is certified that error appears in the above-identified patent and that said Letters Patent is hereby corrected as shown below:

<u>Column 10,</u>
Line 57, delete "camp" and substitute -- clamp --.

<u>Column 16,</u>
Line 21, delete "film" and substitute -- sheet --.

Signed and Sealed this

First Day of October, 2002

Attest:

JAMES E. ROGAN
*Attesting Officer*            *Director of the United States Patent and Trademark Office*